United States Patent [19]

Sweatt

[11] Patent Number: 5,687,264

[45] Date of Patent: Nov. 11, 1997

[54] APPARATUS FOR INJECTING HIGH POWER LASER LIGHT INTO A FIBER OPTIC CABLE

[75] Inventor: William C. Sweatt, Albuquerque, N. Mex.

[73] Assignee: Sandia Corporation, Albuquerque, N. Mex.

[21] Appl. No.: 519,036

[22] Filed: Aug. 24, 1995

[51] Int. Cl.[6] ............................................. G02B 6/32
[52] U.S. Cl. .................... 385/33; 359/19; 359/565; 359/569; 385/37
[58] Field of Search ............................... 385/15, 27, 31, 385/33, 37, 38, 39, 88; 359/15, 16, 19, 565, 566, 569, 571, 573–575

[56] References Cited

U.S. PATENT DOCUMENTS

| 3,698,789 | 10/1972 | Wolber | 359/571 X |
| 3,809,455 | 5/1974 | Pekau et al. | 385/37 |
| 4,585,307 | 4/1986 | Dammann et al. | 359/571 |
| 5,132,079 | 7/1992 | Stewart et al. | 385/15 |
| 5,132,843 | 7/1992 | Aoyama et al. | 359/573 |
| 5,140,657 | 8/1992 | Thylén | 385/37 |
| 5,513,289 | 4/1996 | Hosokawa et al. | 385/33 |

OTHER PUBLICATIONS

Sweatt et al, *Kinoform/lens system for injecting a high power laser beam into an optical fiber*, SPIE, vol. 2114, pp. 82–86, Jul. 1994.

*Primary Examiner*—John D. Lee
*Attorney, Agent, or Firm*—Gregory A. Cone

[57] ABSTRACT

High intensity laser light is evenly injected into an optical fiber by the combination of a converging lens and a multi-segment kinoform (binary optical element). The segments preferably have multi-order gratings on each which are aligned parallel to a radial line emanating from the center of the kinoform and pass through the center of the element. The grating in each segment causes circumferential (lateral) dispersion of the light, thereby avoiding detrimental concentration of light energy within the optical fiber.

12 Claims, 3 Drawing Sheets

APPARATUS FOR INJECTING HIGH POWER LASER LIGHT INTO A FIBER OPTIC CABLE

This invention was made with Government support under Contract No. DE-AC04-94AL85000 awarded by the U.S. Department of Energy. The Government has certain rights in the invention.

BACKGROUND OF THE INVENTION

This invention relates to the coupling of light from a source into a fiber optic cable. More particularly, it relates to injecting high power laser light into the input face of a multimode optical fiber. Still more particularly, it relates to apparatus which spreads the light out as evenly as possible over the face and within the interior of the fiber to prevent damage therein.

Practitioners have always been confronted with the problem of coupling light from a source efficiently into a fiber optic cable. A variety of solutions have been achieved in the general sense, but applications involving the injection of high power laser beams into a smaller diameter fiber optic cable continue to present problems. These applications include medical usages such as laser surgery where the fiber optic cable conveys the laser light energy to a wand in the surgeon's hand. One problem is that if a simple converging lens concentrates the laser light to single point on the face of the fiber optic cable, this point on the face with damaged or destroyed by the high energy there. Convergence in the air outside the fiber should also be avoided due to the problems produced by ionization of the air. Also, if the energy is spread over the face but concentrates downstream within the fiber, the internal concentration point or points in the fiber will also be damaged at high energy levels. Another alternative is disclosed in U.S. Pat. No. 3,809,455 to Pekau et al. in which the light is coupled into the sides of the fiber optic cable rather than the end. There remains an unmet need for a system that can spread the energy both across the input face of the fiber and prevent undesired energy concentration zones downstream within the fiber.

SUMMARY OF THE INVENTION

High energy laser light is coupled into a fiber optic cable through a combination of a converging lens and a kinoform (binary optical element or BOE) which contains a plurality of segments that both spread the input light evenly across the face of the fiber and also skew the light in a lateral or circumferential direction to prevent concentration build-ups within the fiber.

DETAILED DESCRIPTION OF THE INVENTION

Prior work as reported in SPIE Proceedings Vol. 2114, pages 82–86, 'Kinoform/lens system for injecting a high power laser beam into an optical fiber,' W. C. Sweatt and M. W. Faro, October, 1993, utilized a converging lens in combination with a multi-order kinoform to distribute fairly evenly the energy from a high power laser across the face of an optical fiber. This reference contains a very useful background discussion of kinoforms and is incorporated by reference in its entirety herein. The kinoform element in this reference was unsegmented and diffracted the light only in the r-z plane (the plane defined by a radial line on the kinoform and the axis of the kinoform) to produce two concentric maxima on the face of the fiber. As such it was radially symmetric. Although successful at avoiding damage to the face of the fiber, the concentration of energy within the fiber along the fiber axis where the energy in the two rings reconverged had the unintended consequence of causing damage at these locations.

Faced with this new problem, the inventor herein discovered that, by segmenting the kinoform and rotating the grating orientation in each segment by 90° to be parallel to a radial line passing through a respective segment, skew rays could be created that did not present the internal convergence problem within the fiber as was encountered above. These skew rays then corkscrew down the fiber and do not converge into a line focus to any detrimental extent. Stated another way, the re-oriented kinoform switched the radial and circumferential divergence's of the input beam. The beams from each of the segments now have large divergence's in the circumferential (lateral) direction and only small ones in the radial direction. The SPIE reference kinoform produced small or no divergence in the circumferential direction and large divergence in the radial direction.

Since each segment casts its transmitted light onto different areas of the face of the fiber, this new design has the further advantage of breaking up hot spots in the laser beam so as not to concentrate them onto the face of the fiber.

The following preferred embodiment is the design for a particular system. A variety of different implementations can be created by those skilled in the art from the teachings herein and review of the literature. The true scope of the invention is defined by the appended claims.

Figure 1:
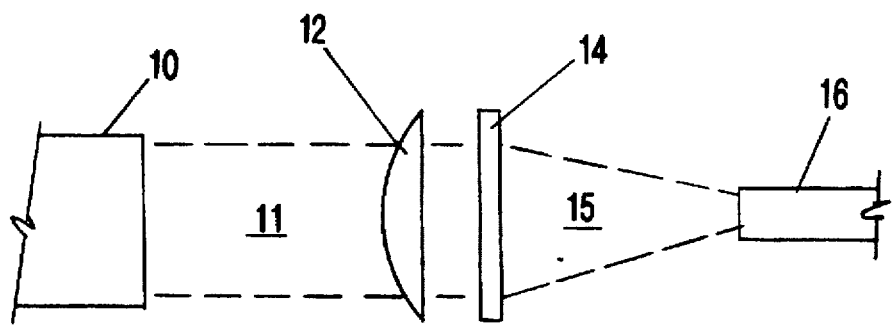
FIG. 1 is a schematic diagram of the system of the invention including the input laser light beam, the converging lens, the kinoform, and the optical fiber.

FIG. 1 shows the basic components of the preferred system. Here a $Nd^{3+}$: YAG laser 10 radiating at 1.064 µm passes its light 11 into a converging lens 12 having a focal length of f=15.5 mm. The laser beam width is about 5 mm. The light passes through the lens into the kinoform 14 which diffracts the light 15 onto the face of the fiber 16. The fiber has a diameter of about 400 µm. The combination of the lens focal length and the kinoform (hereinafter BOE-binary optical element) diameter of d=6 mm gives a numerical aperture of $n.a._{BOE}=0.194$, which is a little smaller than the numerical aperture of the fiber, $n.a._{fiber}=0.22$. In this manner, most of the modes of the fiber will be filled to preclude whispering modes or other potentially catastrophic intensity concentrations down the fiber. The positions of the lens and the kinoform can be reversed without major consequence.

Figure 2:
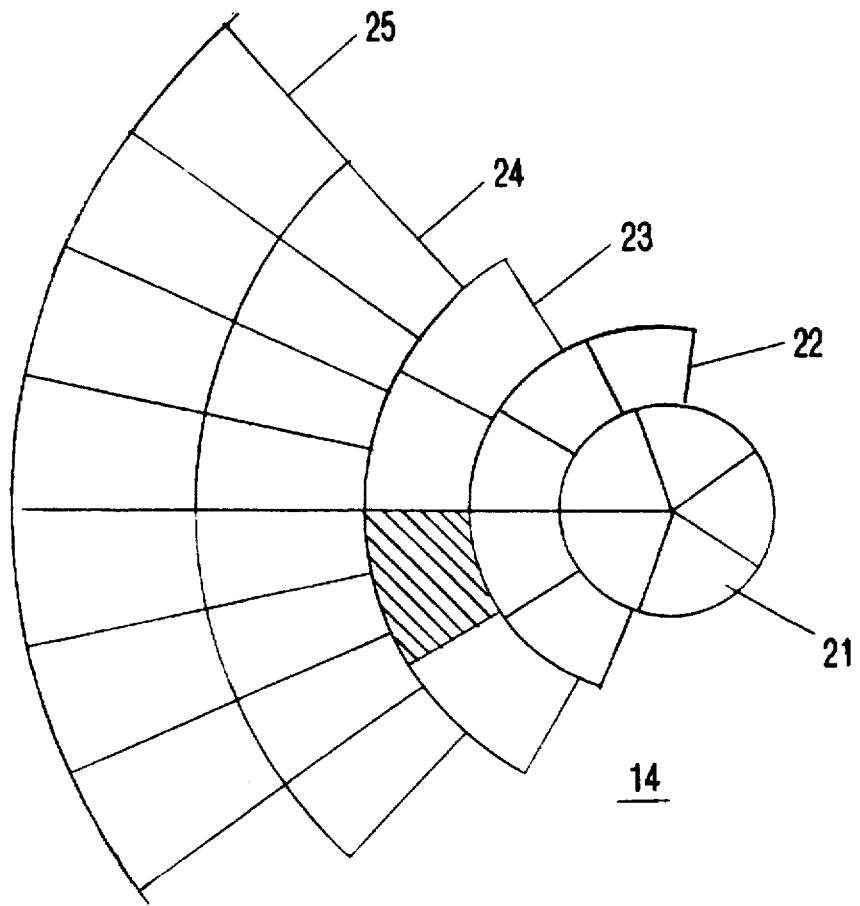
FIG. 2 is a front view of a portion of the segmented kinoform element.

FIG. 2 shows the layout of the segments on the kinoform. There are five rings of segments, 21, 22, 23, 24, and 25. Ring 21 has five segments and a radius of 0.52 mm. Ring 22 has eleven segments and a radius of 0.95 mm. Ring 23 has thirteen segments and a radius of 1.34 mm. Ring 24 has twenty-nine segments and a radius of 2.13 mm. Ring 25 also has twenty-nine segments and a radius of 3 mm. The cross-hatched segment in ring 23 is shown again in FIG. 3 as an enlarged detail.

Figure 3:
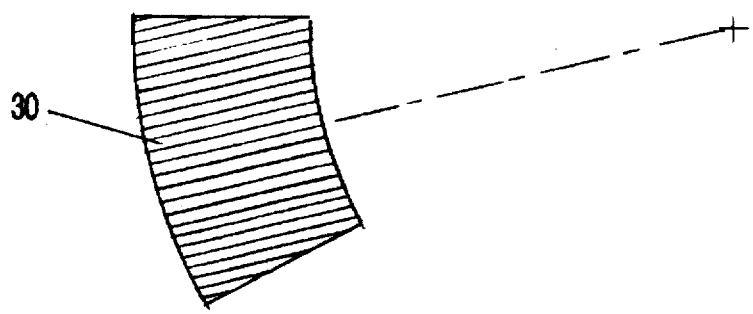
FIG. 3 is a front view of one segment of the kinoform.
Figure 4:
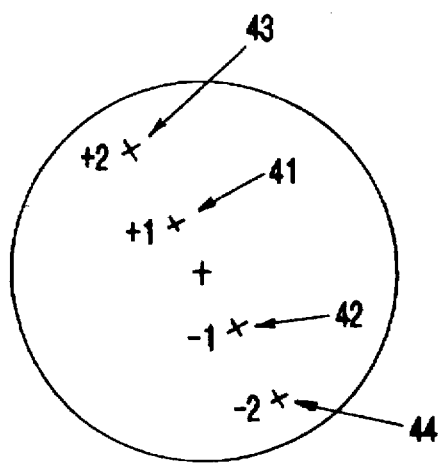
FIG. 4 is a diagram of the intensity profile on the face of the fiber transmitted by the segment of FIG. 3.
Figure 5:
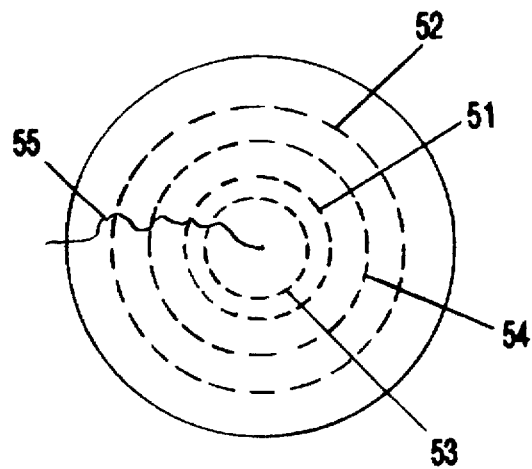
FIG. 5 is a diagram showing the intensity distribution depicted as the centerlines of the circumferential maxima across the face of the fiber for the entire kinoform element.
Figure 6:
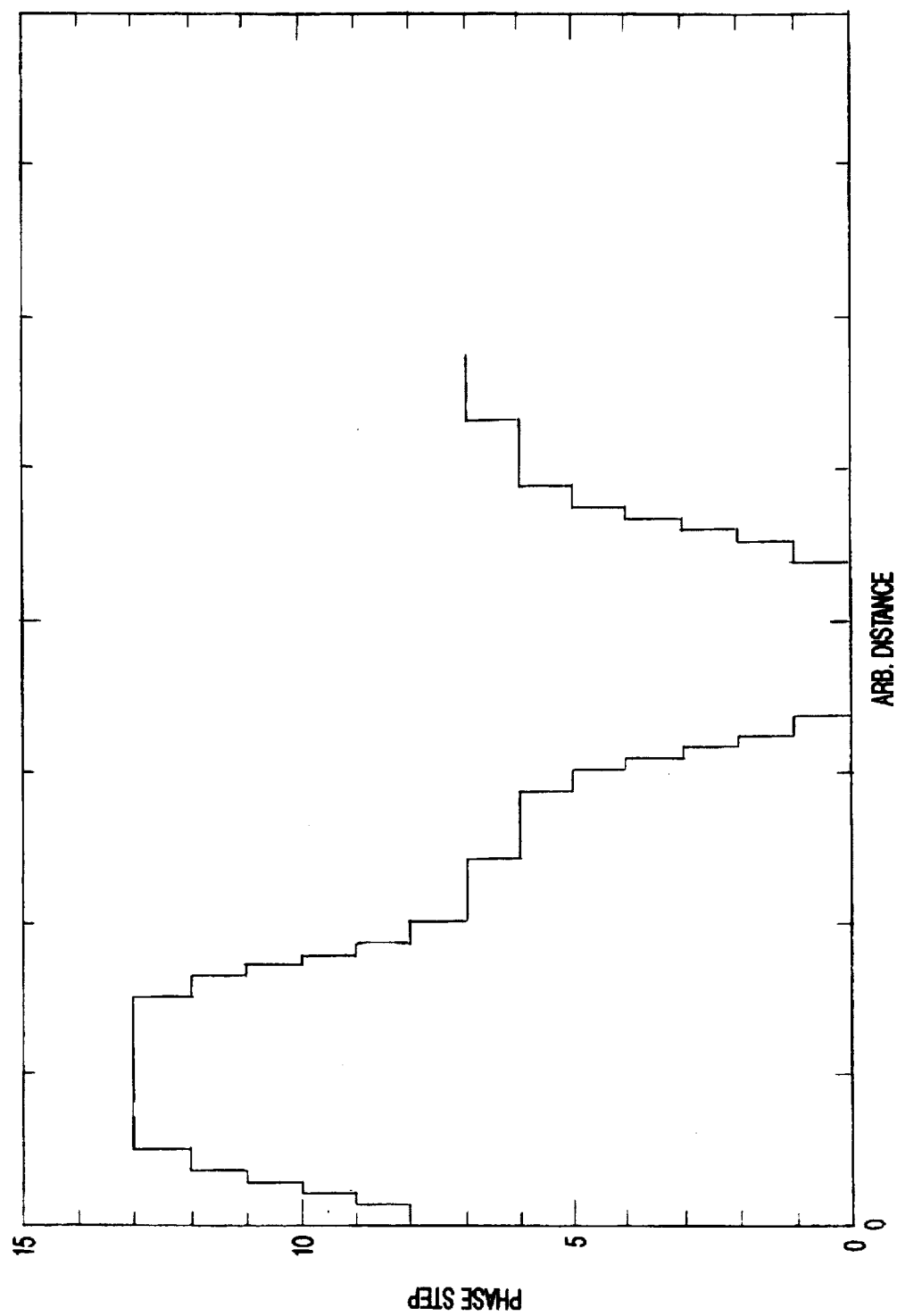
FIG. 6 is a graph showing the cross section of the kinoform grating that produces the ±1 and ±2 orders of the laser light.

The individual segment 30 in FIG. 3 shows the orientation of the fringes in that segment as being parallel to a radial line from the center of the kinoform. The cross-section of one period of these fringes is shown in FIG. 6. The grating within the segment 30 diffracts only the ±1 and ±2 orders of the light onto the face of the optical fiber. These orders appear as four spots, 41, 42, 43, and 44, as shown in FIG. 4, corresponding to the ±1 and ±2 orders respectively. The sum of the spots from all the segments is shown in FIG. 5. The gratings in each of the five rings of segments have been spaced such that the odd-numbered rings, 21, 23 and 25, throw the ±1 and ±2 orders onto bands 51 and 52 on the face of the fiber having radii of 75 and 150 µm. The even-numbered rings, 22 and 24, throw the ±1 and ±2 orders onto bands 53 and 54 of radii 52.5 and 105 µm as shown. This is done by spacing the fringes (the grating periods) at 9.3 fringes/mm for the odd rings and by 6.4 fringes/mm for the even rings. A profile 55 of the light energy reaching the fiber face is shown superimposed over the four bands 51, 52, 53 and 54.

FIG. 6 displays the surface profile for one period of the kinoform. The design of the kinoform was achieved using the algorithm described in the reference M. W. Faro, "New iterative algorithm for the design of phase-only gratings" Proc. Soc. Photo-Opt. Instrum. Eng. 1555, 34–42 (1991). This reference is incorporated by reference. The theoretical efficiency of this grating is over 90% with the remaining light going into higher orders that disperse out towards the fiber cladding. The low energy levels in this remaining light do not create a damage risk. Each vertical step in the profile represents a phase delay of about $\lambda/15$, where $\lambda$ is the light wavelength (here 1.06 µm). In this profile each step is about 0.16 µm, calculated as $\Delta h=[1.06 \text{ µm}/15]/[1.44-1]$. The horizontal scale here is in arbitrary distance units. As mentioned above, the period of the kinoform (BOE) will vary depending upon where one desires to throw the diffracted spots on the face of the fiber. Here the spacings are 9.3 and 6.4 fringes (periods) per millimeter.

The numbers of segments in each ring were chosen to be odd numbers because if even numbers of segments were used in each ring, the oppositely disposed segments would throw overlapping spots onto the face of the fiber. By using odd numbers of segments in each ring, there is no overlap between segments in that ring.

Other embodiments are possible. For example, a simpler arrangement can be created by using fewer rings or only a single ring of segments having multi-order gratings of the type discussed above that transmit the ±1 and ±2 orders. Again, the number of segments in a ring should be an odd number to avoid overlap. In a slightly different configuration, a multi-segment, multi-ring array such as that shown in FIG. 2 can be employed wherein the gratings in different rings or in different segments are fabricated to throw the light preferentially clockwise only or counter-clockwise only as between rings or segments so as to evenly distribute the light within the fiber. These gratings could be either single or multi-mode. The BOE is the standard stair-step design that diffracts most of the light into the plus or minus 1 orders.

What is claimed is:

1. Apparatus for injecting light into an input face of an optical fiber comprising:

a converging lens, and a multisegment kinoform wherein the BOE grating on each segment is aligned parallel to a radial line emanating from the center of the kinoform and passing through that segment with the grating adapted to cause circumferential dispersion to the light transmitted from the segment to the input face of the fiber, the combination of the lens and the kinoform being aligned between the source of the light and the fiber.

2. The apparatus of claim 1 wherein the BOE grating on the segment diffracts light into at least one order.

3. The apparatus of claim 2 wherein the grating preferentially passes the ±1 and ±2 orders only.

4. The apparatus of claim 1 wherein the segments are organized into at least one concentric ring about the center of the kinoform.

5. The apparatus of claim 4 wherein the number of segments in a concentric ring is an odd number.

6. The apparatus of claim 4 wherein the BOE period spacing of the segments is varied between rings so as to provide uniform illumination of the face of the fiber.

7. The apparatus of claim 6 wherein the period spacing of the segments within a concentric ring is constant.

8. Apparatus for injecting light into an input face of an optical fiber comprising:

a converging lens, and a multisegment kinoform wherein the BOE grating on each segment is a multi-order grating aligned parallel to a radial line emanating from the center of the kinoform and passing through that segment with the grating adapted to cause circumferential dispersion to the light transmitted from the segment to the input face of the fiber, the combination of the lens and the kinoform being aligned between the source of the light and the fiber.

9. The apparatus of claim 8 wherein the segments are organized as a plurality of concentric rings about the center of the kinoform.

10. The apparatus of claim 9 wherein the number of segments in each of the concentric rings is an odd number.

11. The apparatus of claim 8 wherein the period spacing of the segments is varied between segments so as to provide uniform illumination of the face of the fiber.

12. The apparatus of claim 11 wherein the period spacing of the segments within a concentric ring is constant.

* * * * *